UNITED STATES PATENT OFFICE.

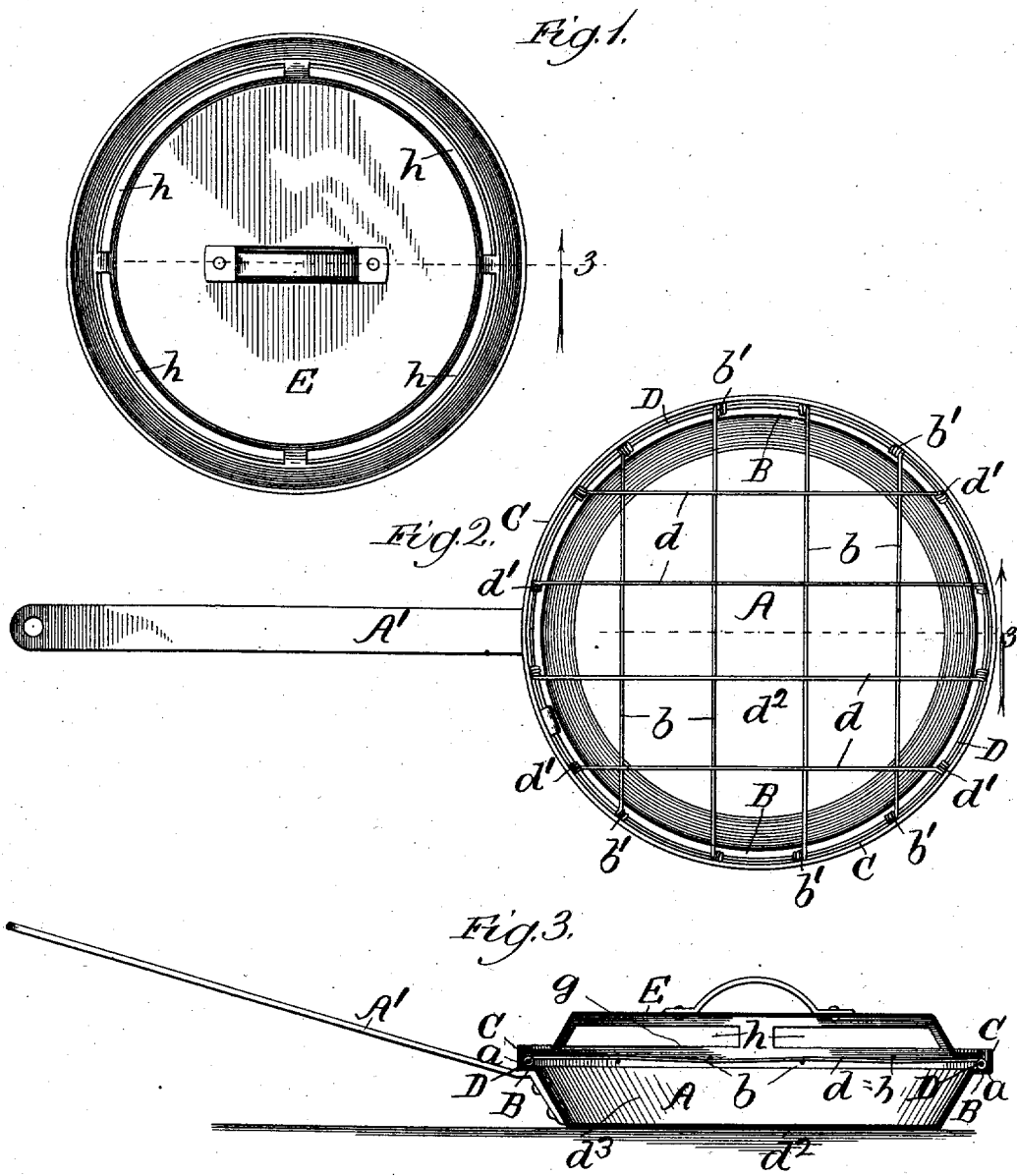

SARAH E. ONSTOTT, OF CHICAGO, ILLINOIS.

TOASTER.

SPECIFICATION forming part of Letters Patent No. 562,646, dated June 23, 1896.

Application filed November 18, 1895. Serial No. 569,247. (No model.)

*To all whom it may concern:*

Be it known that I, SARAH E. ONSTOTT, a citizen of the United States, residing at Chicago, in the county of Cook and State of Illinois, have invented certain new and useful Improvements in Toasters; and I do hereby declare the following to be a full, clear, and exact description of the invention, such as will enable others skilled in the art to which it appertains to make and use the same.

This invention relates to improvements in that class of culinary utensils known as "toasters" or "broilers," but is more especially designed for use in toasting bread.

It is a well-known fact, generally, that the preparing of good, palatable toasted bread is rather a difficult matter, and especially so when the work has to be done over an oil or gas stove.

The object, therefore, of this invention is to provide a device of this character that will enable the most inexperienced to prepare nicely-browned, palatable toast over any kind of a stove or burner.

Figure 1 is a plan of the cover. Fig. 2 is a plan of the device proper with the cover removed, &c. Fig. 3 is a vertical section on line 3, Figs. 1 and 2, looking in the direction indicated by the arrow.

A represents a pan or vessel provided with a handle A', and resembling in appearance an ordinary frying-pan. The edge of this pan is provided with an annular horizontal flange B, having the upturned vertical rim C, which is a continuation of the flange B. This arrangement provides an offset or seat $a$, in which is loosely seated a ring D. A number of wires or cross-bars $b$ have their respective ends secured to the ring D, as at $b'$. A second series of wires $d$ run at right angles to the first series, and have their respective ends secured to ring D, as at $d'$. These wires are arranged at intervals and form the open-work surface on which the bread or other article is placed in the process of toasting.

It will be observed that the toasting-surface is some ways above the imperforate bottom $d^2$ of the pan, and providing the hot-air chamber or space $d^3$ therebetween, thus tempering and distributing the heat evenly, and avoid burning the bread or showing wire-marks on the surface thereof.

In practice it is learned that the distance between the solid bottom of the pan and the wire-surface should ordinarily be about one and one-half inches.

The holding-ring D and the cross wires or bars secured thereto are made separable, so that this part of the device may be readily removed to permit of the inside of the pan to be cleaned with facility, and also to permit of its being used for other purposes. Otherwise the respective ends of the cross wires or bars might be permanently secured to the edge of the pan, so far as all practical purposes are concerned.

The raised cover E is of a little less diameter than that of the surrounding rim of the pan, so as to rest down on the inside of the same, and rest on the outer edge of the toasting-surface and not slide off when the device is being used. A hot-air chamber $g$ is provided between the upper side of the toasting-surface and the inside top of the raised cover. The side wall of the cover has a number of openings $h$ for the gradual escape of the heat, the top of the cover being imperforate. This arrangement of the cover insures a uniform distribution of the heat, above as well as below the open-work surface, so that the top side of the bread will be toasted or browned to a certain extent before being turned. The area of the openings in the side wall of the cover will be graduated as practical working shall require. The top of the cover being imperforate, the heated air does not escape directly, but is reflected, to a certain extent, back onto the surface of the bread before passing out through the openings.

Another advantage attained in this device is that a portion of the moisture present in the bread is retained in the center, while the outer surfaces are brown and crisp, thus imparting to the toast a palatable flavor, instead of being dry, insipid, and tasteless.

It will be readily understood that by means of this device bread may be toasted over any type of stove, lamp, or the ordinary gas-burner, without being burned or in the least absorbing any of the odors attending the use of certain kinds of stoves.

It is obvious that instead of the wire holding-ring and the series of cross-wires a toasting-surface may be stamped out of a sheetmetal plate, and having either cross-bars or perforations.

Having thus described my invention, what I claim, and desire to secure by Letters Patent, is—

1. In a device of the kind described, the combination with an imperforate pan or vessel, of an open-work toasting-surface, removably supported in position, and a raised cover, having a side wall provided with perforations or openings therethrough on a line with the toasting-surface, substantially as described.

2. In a device of the kind described, the combination with an imperforate pan or vessel, provided around its edge with a horizontal flange and a vertical rim, of a ring, resting loosely on said flange, a number of wires, crossing each other at right angles and having their respective ends secured to said ring, and a raised cover, having openings through its side wall on a line with the toasting-surface, substantially as described.

In testimony whereof I affix my signature in presence of two witnesses.

SARAH E. ONSTOTT.

Witnesses:
L. M. FREEMAN,
L. B. COUPLAND.